Nov. 11, 1969   P. D. STONE ET AL   3,477,334
NAIL
Filed Nov. 2, 1967   2 Sheets-Sheet 1

INVENTORS
Phillip D. Stone,
Michael J. Stone
Wolf, Greenfield & Hicken

Nov. 11, 1969  P. D. STONE ET AL  3,477,334
NAIL
Filed Nov. 2, 1967  2 Sheets-Sheet 2

INVENTORS
Phillip D. Stone,
Michael F. Stone
Wolf, Greenfield & Hieken

United States Patent Office 3,477,334
Patented Nov. 11, 1969

3,477,334
NAIL
Phillip D. Stone, Hanover, and Michael F. Stone, Brockton, Mass. (both of 57 Pine St., Canton, Mass. 02021)
Filed Nov. 2, 1967, Ser. No. 680,246
Int. Cl. F16b 15/06, 15/08, 15/00
U.S. Cl. 85—21     2 Claims

ABSTRACT OF THE DISCLOSURE

A headed nail having a head and shank with the shank having a plurality of radially extending flanges in cross section. The flanges undulate or are longitudinally crimped with the undulations or crimps extending from the inner longitudinal edge to the outer longitudinal edge. In a modification, the flanges are spiralled and in another modification the outer edges are barbed.

Background of the invention

The present invention relates to driven headed fasteners, and in particular to nails. There have been a variety of specially shaped nails designed for effectively locking the nails in a work piece. These nails include for example, flanged nails in which the flanges extend radially from a longitudinal axis. Nails which have been developed however, as exemplified by United States Letters Patent No. 2,190,883 and No. 3,121,366, are not altogether satisfactory because they do not provide as effective holding power in relation to their size and weight as desired. Further, such prior art nails are not in every instance as easy to drive into wood, and do not provide sufficient holding surface, and do not minimize the likelihood of splitting wood, as is desired.

It is therefore an object of the present invention to provide an improved driven fastener and in particular a lock nail which is easier to drive into wood and other material than rounded nails, is not likely to upset wood fibers; is not likely to split material into which it is driven, and is capable of being used with cheap woods. A further object of this invention is to provide a driven headed fastener of the flanged variety that provides an increased count per pound when compared with common nails of the same diameter; affords greater stiffness and tensile strength and will not bend easily; is easier to hold than common nails; requires less storage space and smaller cartons for common nails of equivalent weight; and prevents turning of the nails or of two works pieces that are secured together by the nails.

The present invention also provides an improved construction over other flanged nails in that it has better holding power and a greater holding surface; can be manufactured, collated and nested easily, and can be formed from a variety of metals, both ferrous and non-ferrous and, for example, may permit the use in many applications of low carbon steel nails where high carbon steel, heat-treated and tempered nails would otherwise be required.

Summary of invention

The present invention is designed to attain the objects and advantages enumerated above, and provides a driven-headed fastener having a head and shank in which the shank is formed of a plurality of flanges extending radially from a longitudinal axis for the length of the shank. The flanges are each crimped or undulated along their length for the full width of the flange. The flanges may in modifications be barbed along their outer edges and spiralled. The undulations may be rounded or sharp and depending upon the particular characteristics desired may be phased or unphased with respect to adjacent undulations or crimps in adjacent flanges.

Brief description of the drawings

The foregoing objects and advantages of the present invention will be more clearly understood when considered in conjunction with the accompanying drawings, in which.

Description of the preferred embodiments

Figure 1:
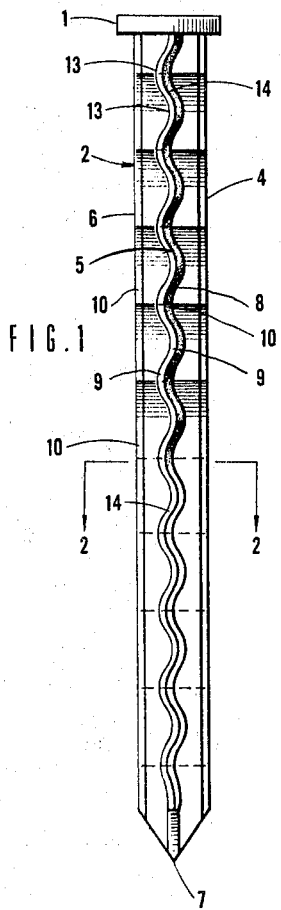
FIG. 1 is an elevational view of a nail embodying a preferred form of the invention.
Figure 2:
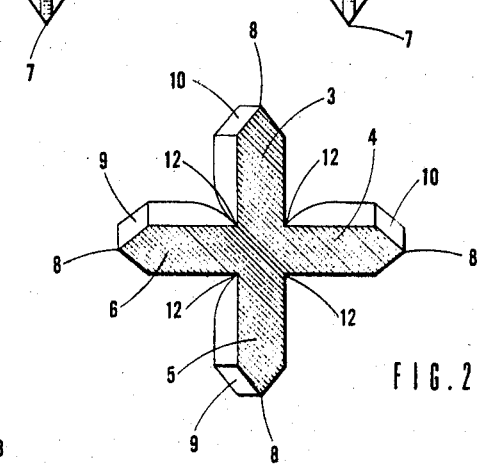
FIG. 2 is a cross-sectional view taken along the line 2—2 of FIG. 1.

In FIG. 1 there is illustrated a driven headed fastener having a head 1 and a shank 2. The head 1 may be flat as illustrated, countersunk, round, oval, slotted, or any other style preferred, formed in a conventional fashion. The shank 2 is formed with a plurality of flanges 3, 4, 5 and 6. While four flanges, as illustrated, are preferred a fewer or greater number may be utilized. In the embodiment illustrated in FIG. 1, the flanges 3, 4, 5 and 6 are similar to each other. These flanges extend longitudinally of the shank 2 from the head 1 to the point 7. the head 1 is formed at one end by conventional techniques. This may be effected by cold or hot heading procedures, welding or other known techniques. The other end of the flanges 3, 4, 5 and 6 are formed into a point 7 of desired style (i.e. standard diamond point, long diamond point, blunt diamond point, needle point, etc.) using conventional techniques. The outer longitudinally extending edges 8 of each of the flanges are bevelled in cross section, as illustrated in FIG. 2 forming faces 9 and 10 along their length. Preferably these edges 8 lie in planes parallel to one another and to the longitudinal axis of the shank 2. Each flange 3, 4, 5 and 6 is undulated or crimped from its outer edge 8 to its inner edge 12 that is common with the adjacent flanges. These undulations or crimps are each formed with high areas 13 and low areas 14. In the embodiment illustrated in FIG. 1, the high areas 13 in flange 8 are in phase with the high areas of each of the other flanges. That is, the high areas 13 in each flange coincide with one another in a plane normal to the longitudinal axis of the shank.

In the embodiment illustrated in FIGS. 3 and 4, like numerals indicate components similar to that illustrated and described in connection with FIGS. 1 and 2. In these arrangements, however, the phase relations of the high and low areas 13 and 14 in one flange are not coincident respectively with the high and low areas 13 and 14 in another flange.

Figure 3:
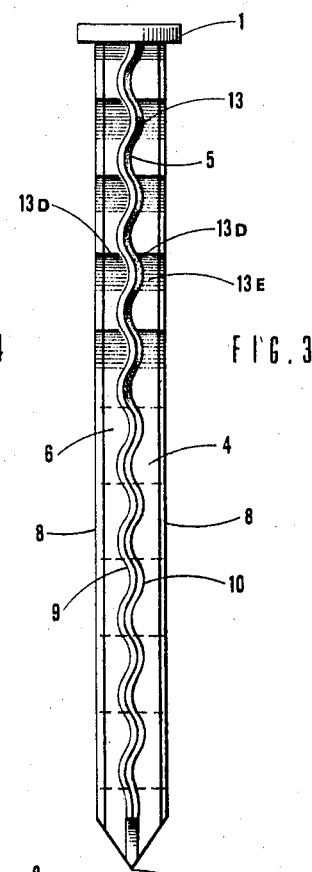

In the modification of FIG. 3, the high areas 13D of the flanges 4 and 6 are 90 degrees out of phase with the high areas 13E of the flanges 3 and 5.

Figure 4:
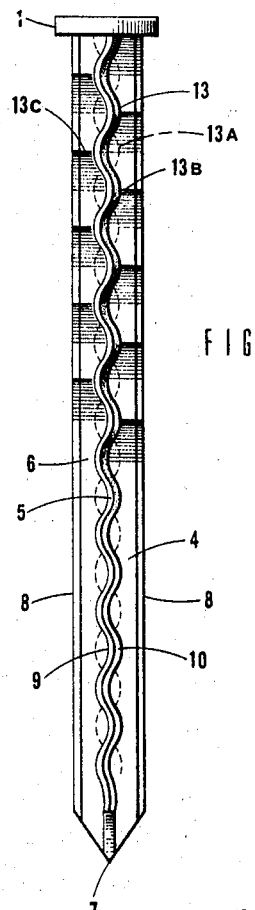
FIGS. 3, 4 and 5 are each elevational views of modifications of the invention.

In FIG. 4, high areas 13 in flange 5 are about 180 degrees out of phase with high areas 13A in flange 3. Similarly, the high areas of flange 13B in flange 4 are about 180 degrees out of phase with the high areas 13C in flange 6. The low areas 14 of one flange are similarly 180 degrees out of phase with the low areas of the opposite flange 3.

Figures 5, 6:
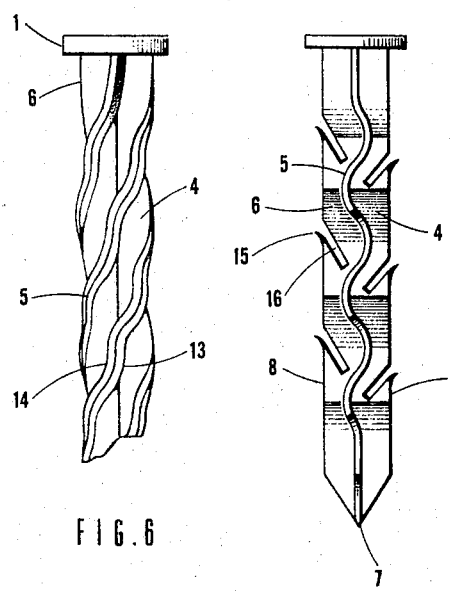
FIGS. 6 to 10 are fragmentary elevational views of further modifications of the invention.

In the embodiment of FIG. 5, the head 1 is secured to flanges 4, 5 and 6 in a manner as heretofore described. In addition, a fourth flange (not shown) is similar to flange 3 of the other modifications. Each of the outer edges 8 of these flanges is provided with a series of barbs or teeth 15. These teeth or barbs are formed by notches 16 cut at an angle directed toward the point 7.

In the embodiment of FIG. 6, the arrangement is similar to that as described in connection with FIG. 1 with the sole exception that each of the flanges 3, 4, 5 and 6 are spiralled at a slight angle from the head 1 towards the point thereby affording a screw-like configuration to the nail.

Figure 7:
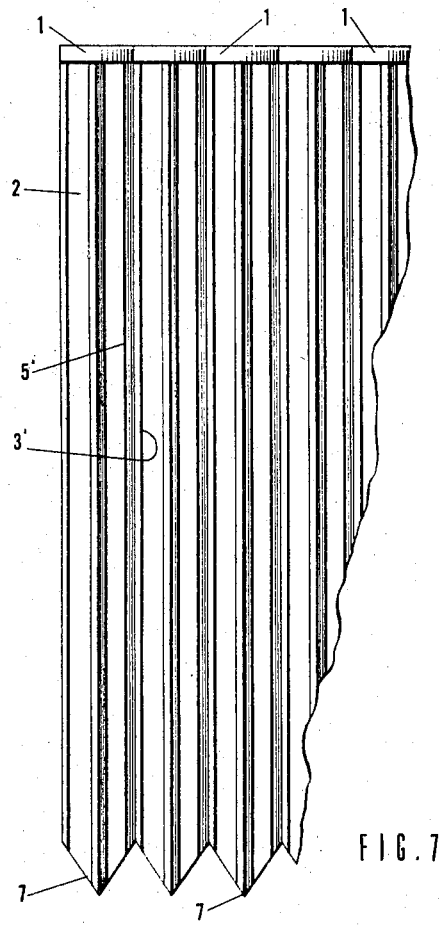
Figure 10:
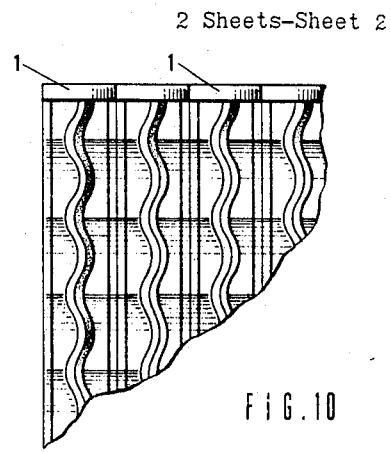
Figure 11:
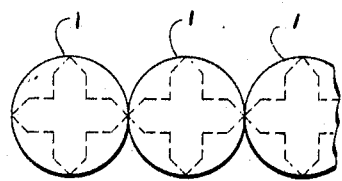
FIG. 11 is a top plan view of the modification of FIG. 7.

Referring to the embodiments of FIG. 7 to FIG. 11, there are illustrated embodiments of full-headed nails, particularly for manufacture and sale in a clip cartridge or group form with the individual nails adapted for ease in collating in a nail machine. In this arrangement the shanks 2 may be formed in one of the forms previously described or with straight flanges as illustrated in FIG. 7. The heads 1 are flat heads having a diameter preferably no greater than the width of the shanks at their widest. In this arrangement, with the heads having a diameter no greater than the width of the shanks at their widest, the nails are formed side by side with the edges of adjacent flanges 5' and 3' of adjacent nails in abutting relationship as best illustrated in FIG. 11. These flanges may be secured together in their abutting relation by cement or by separately disposable holders for severance one from the other at the time of utilization. In addition, the invention contemplates an arrangement in which the nails are arranged in a shingled or step relationship. In this arrangement, the heads 1 may have a diameter somewhat greater than the outer diameters of the nail through opposed flanges. The heads in this arrangement are staggered or stepped with one head partially overlapping or underlying an adjacent head These nails when arranged in cartridge form may be similarly secured as, for example, by cementing adjacent abutting portions with cement capable of being broken upon the application of a desired degree of force.

Figure 8:
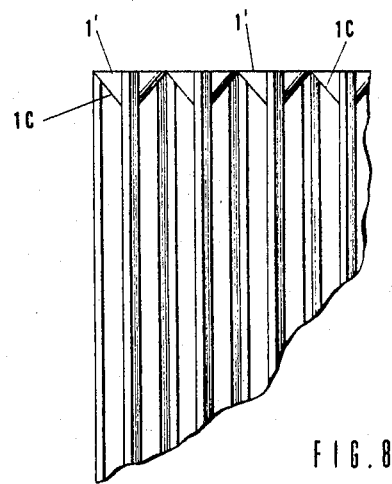

FIG. 8 illustrates a modification of FIG. 7 in which the heads 1' are formed as a wood head screw having a conical lower surface 1c tapering toward the axis of the shank.

Figure 9:
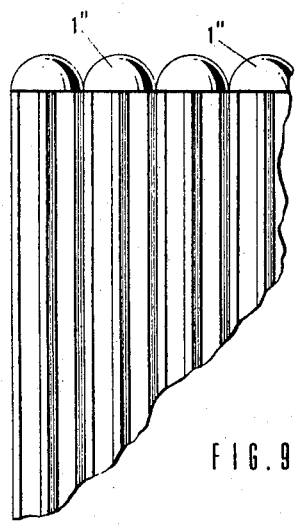

FIG. 9 illustrates a nail similar to that of FIG. 7 with rounded heads 1" each having a diameter no greater than the widest diameter of the shank.

FIG. 10 illustrates an embodiment similar to that of FIG. 7 with the exceptions that the flanges or splines are undulated or crimped as illustrated.

What is claimed is:

1. A headed nail comprising a head and shank with said head secured to one end of said shank and said shank extending longitudinally from said head to and terminating at a point, said shank comprising a plurality of elongated flanges lying longitudinally of and extending radially from the longitudinal axis of said shank with each flange extending at an angle from said head in a screw-like configuration along said shank to substantially define at least one revolution about said longitudinal axis, said head overlying said flanges at said one end and spanning over spaces defined between said flanges, said flanges each having an outer edge and an inner edge with undulations extending lengthwise of each said flange and widthwise for the full width thereof from said outer edge to said inner edge of each flange, said outer edges each being formed by forming faces defining a sharp cutting edge.

2. A headed nail as set forth in claim 1 wherein said flanges are barbed.

References Cited

UNITED STATES PATENTS

| 232,745 | 9/1880 | Moore | 85—19 |
| 2,190,883 | 2/1940 | Pauze | 85—21 |
| 2,294,463 | 9/1942 | Krantz | 85—17 |
| 2,412,517 | 10/1946 | Klein | 85—19 |
| 2,909,781 | 10/1959 | Ollig et al. | 85—17 |

FOREIGN PATENTS 301,936  12/1928  Great Britain.

EDWARD C. ALLEN, Primary Examiner

U.S. Cl. X.R.

85—17, 19, 20